(12) United States Patent
Morita et al.

(10) Patent No.: US 7,085,101 B1
(45) Date of Patent: Aug. 1, 2006

(54) MAGNETIC TAPE CARTRIDGE WITH ROTATABLY-MOUNTED MULTI-PROJECTION BRAKE RELEASE MEMBER

(75) Inventors: Kiyoo Morita, Kanagawa-ken (JP); Hideaki Shiga, Kanagawa-ken (JP); Daisuke Takahashi, Kanagawa-ken (JP); Yusuke Ishihara, Kanagawa-ken (JP); Seiji Tsuyuki, Kanagawa-ken (JP); Jeffrey S. McAllister, Boise, ID (US); Thomas Albrecht, San Jose, CA (US); Robert Ralph Heinze, San Clemente, CA (US)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/220,336

(22) Filed: Dec. 24, 1998

(30) Foreign Application Priority Data

Dec. 25, 1997 (JP) .............................. 9-356722

(51) Int. Cl.
*G11B 23/107* (2006.01)

(52) U.S. Cl. .................................... 360/132; 242/338.1
(58) Field of Classification Search ................. 360/132; 242/338.1, 343, 343.1, 343.2, 348, 348.2
See application file for complete search history.

(56) References Cited

U.S. PATENT DOCUMENTS 5,366,173 A    11/1994  Lammers et al. ......... 242/338.1
5,901,916 A *  5/1999  McAllister et al. ......... 242/348

FOREIGN PATENT DOCUMENTS

DE    40 23 590 A1    1/1991
DE    90 14 850.9    2/1991
EP    0 143 592 A2    6/1985
EP    0 284 687 A2    10/1988

OTHER PUBLICATIONS

"Cartridge Reel Brake." IBM Technical Disclosure Bulletin, vol. 28, No. 10, Mar. 1986, p. 4552. XP-002099977.
M. E. Prahl: "Cassette Reel Lock." IBM Technical Disclosure Bulletin, vol. 13, No. 7, Dec. 1970, p. 1763. XP-002099978.

* cited by examiner

*Primary Examiner*—Craig A. Renner
(74) *Attorney, Agent, or Firm*—Sughrue Mion, PLLC

(57) ABSTRACT

A magnetic tape cartridge includes a cartridge casing and a single reel which is contained in the cartridge casing for rotation. The reel has a reel hub in the form of a cylindrical member which has a bottom wall and is provided with an opening and a stopper gear formed on the bottom wall. A brake member is provided with a brake gear and is movable up and down between an operative position where the brake gear is brought into engagement with the stopper gear to prevent rotation of the reel and a retracted position where the brake gear is disengaged from the stopper gear to permit rotation of the reel. The brake member is normally urged toward the operative position and moved to the retracted position by a pusher member of a tape drive system which acts on the brake member through the opening in the reel hub when the magnetic tape cartridge is loaded in the tape drive system. A continuous wall portion is erected around the opening in the reel hub, and the brake member includes a horizontal portion and a continuous skirt portion which extends downward from the horizontal portion and is in contact with the continuous wall portion of the reel hub to close the opening together with the horizontal portion. The brake member is moved between the operative position and the retracted position with the skirt portion kept in contact with the continuous wall portion of the reel hub.

16 Claims, 17 Drawing Sheets

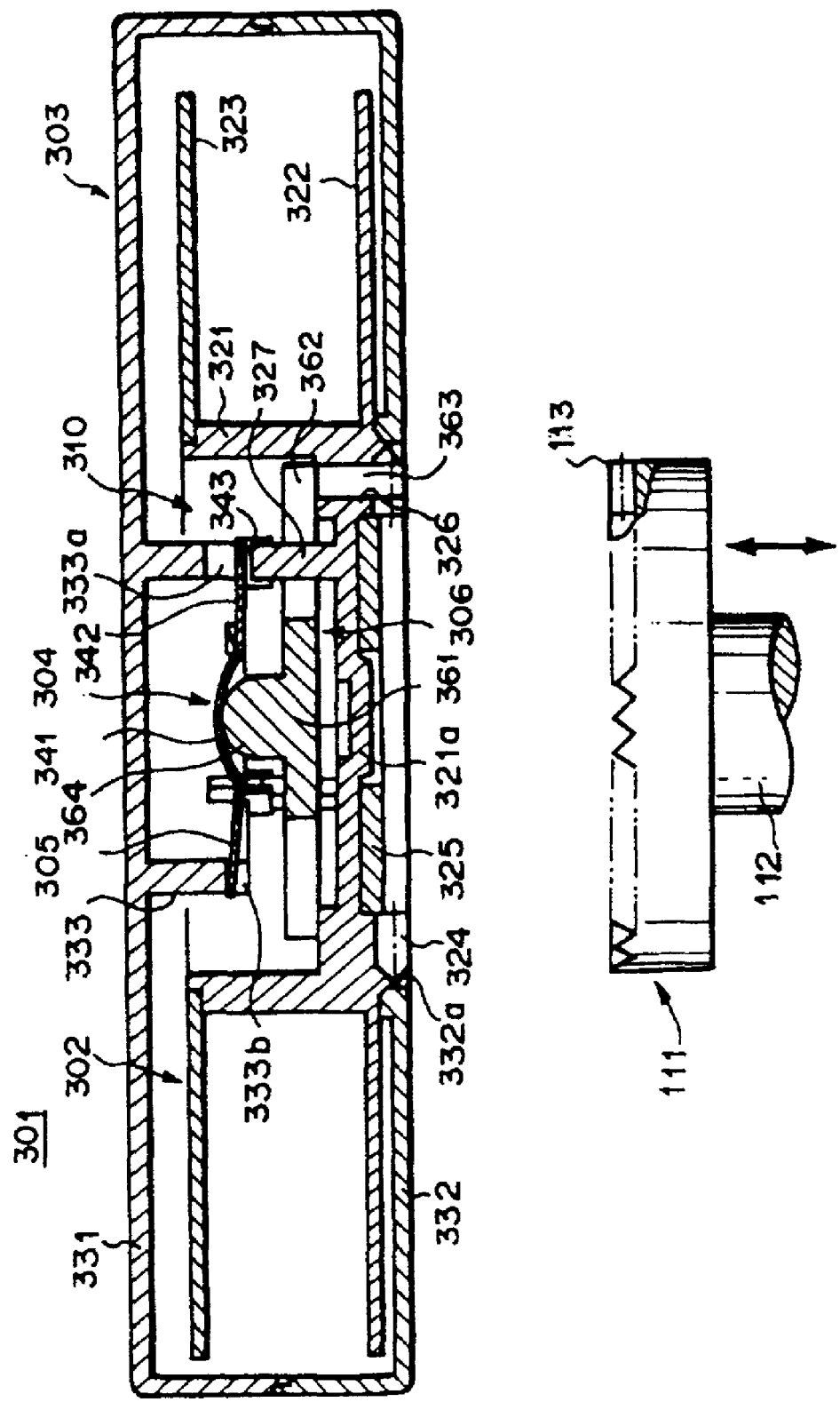

MAGNETIC TAPE CARTRIDGE WITH ROTATABLY-MOUNTED MULTI-PROJECTION BRAKE RELEASE MEMBER

BACKGROUND OF THE INVENTION

1. Field of the Invention

This invention relates to a magnetic tape cartridge, and more particularly to a magnetic tape cartridge comprising a cartridge casing and a single reel around which a magnetic tape is wound and which is contained in the cartridge casing for rotation.

2. Description of the Related Art

There has been known a single reel magnetic tape cartridge, comprising a cartridge casing and a single reel around which a magnetic tape is wound and which is contained in the cartridge casing for rotation, as a recording medium for an external storage for a computer and the like. Such a single reel magnetic tape cartridge is used for retaining important data of a computer or the like and accordingly is arranged so that trouble such as tape jamming does not occur and the magnetic tape is not accidentally drawn out.

The reel is provided with a cylindrical reel hub having a closed bottom and stopper gear teeth are formed in a circle and a brake member provided with a brake gear which is adapted to be brought into engagement with the stopper gear teeth is disposed to be movable in the direction of thickness of the cartridge casing along the axis of rotation of the reel. The brake member is urged, for instance, by a coiled spring toward a position where the stopper gear teeth are engaged with the break gear to prevent rotation of the reel when the magnetic tape cartridge is not used. When the magnetic tape cartridge is loaded in a recording and reproducing system, a brake release spindle of the recording and reproducing system pushes upward the brake member to disengage the stopper gear teeth from the brake gear.

However if a space is formed between the brake member and the reel hub when the brake member is moved upward, dust and dirt can enter the inside of the cartridge casing through the space.

SUMMARY OF THE INVENTION

In view of the foregoing observations and description, the primary object of the present invention is to provide a magnetic tape cartridge in which dust and dirt can be prevented from entering the inside of the cartridge casing when the brake member is moved upward to permit rotation of the reel.

In accordance with the present invention, there is provided a magnetic tape cartridge comprising a cartridge casing, a single reel around which a magnetic tape is wound and which is contained in the cartridge casing for rotation, the reel having a reel hub in the form of a cylindrical member which has a bottom wall and is provided with an opening and a stopper gear formed on the bottom wall, and a brake member which is provided with a brake gear and is movable up and down between an operative position where the brake gear is brought into engagement with the stopper gear to prevent rotation of the reel and a retracted position where the brake gear is disengaged from the stopper gear to permit rotation of the reel, the brake member being normally urged toward the operative position and moved to the retracted position by a pusher member of a tape drive system which acts on the brake member through the opening in the reel hub when the magnetic tape cartridge is loaded in the tape drive system, wherein the improvement comprises that a continuous wall portion is erected around the opening in the reel hub, and the brake member comprises a horizontal portion which is disposed above the opening in the reel hub and receives force from the pusher member when the brake member is moved to the retracted position and a continuous skirt portion which extends downward from the horizontal portion and is in contact with the continuous wall portion of the reel hub, thereby closing the opening together with the horizontal portion, the brake member being moved between the operative position and the retracted position with the skirt portion kept in contact with the continuous wall portion of the reel hub.

It is preferred that the brake member comprises a first member and a second member which abuts against the first member from above and is movable up and down together with the first member, said horizontal portion and the skirt portion are formed on the first member and the brake member is urged toward the operative position by a spring means which acts on the second member.

The skirt portion may be fitted either on or in the continuous wall portion.

In the case where the brake member comprises the first and second members, it is preferred that the first and second members abut against each other by way of a projection and the first and/or second members be formed of low friction hardwearing material.

In the magnetic tape cartridge of the present invention, the skirt portion is kept in contact with the continuous wall portion on the reel hub to keep the opening closed even when the brake member is in the retracted position, entrance of dust and dirt into the cartridge casing through the opening can be prevented.

BRIEF DESCRIPTION OF THE DRAWINGS

FIG. 24 is a cross-sectional view of a magnetic tape cartridge in accordance with a fifth embodiment of the present invention in a state where the magnetic tape cartridge is not used.

DESCRIPTION OF THE PREFERRED EMBODIMENT

Figure 1:
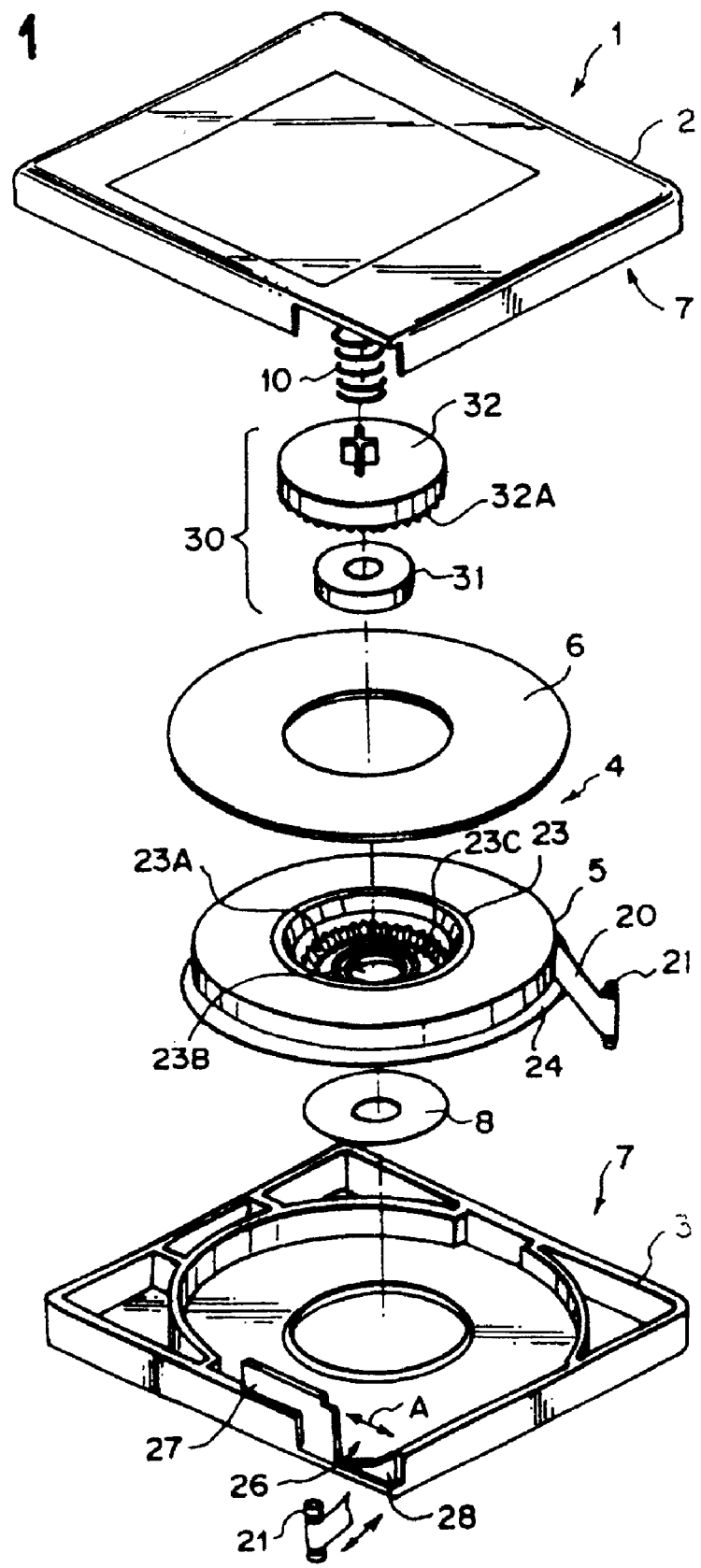
FIG. 1 is an exploded perspective view of a magnetic tape cartridge in accordance with a first embodiment of the present invention.

In FIG. 1, a magnetic tape cartridge 1 in accordance with a first embodiment of the present invention comprises a single reel 4 around which a magnetic tape 20 is wound and is contained for rotation in a cartridge casing 7. The reel 4 is formed by bonding together a lower reel half 5 and an upper reel half 6 by ultrasonic welding. The cartridge casing 7 is formed by fastening together upper and lower casing halves 2 and 3 by screws and the like.

The lower reel half 5 comprises a cylindrical hub 23 and a flange 24 which are integrally molded from synthetic resin. A reel plate 8 for magnetically connecting a drive mechanism of a recording and reproducing system is mounted on the outer bottom surface of the hub 23. Further on the inner bottom surface of the hub 23, is formed a stopper gear 23A which is brought into engagement with a brake gear 32A formed on a brake member 30 to be described later and prevents rotation of the reel 4 when the magnetic tape cartridge 1 is not used. The hub 23 is provided with an opening 23B, through which a brake release spindle in the recording and reproducing system is inserted to push upward the brake member 30. An annular groove 23C in which the brake member 30 is fitted is formed around the opening 23B.

Figure 2:
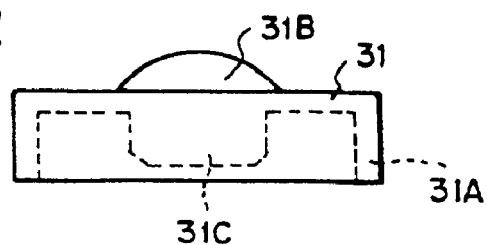
FIG. 2 is a side view of the first member of the brake member.
Figure 3:
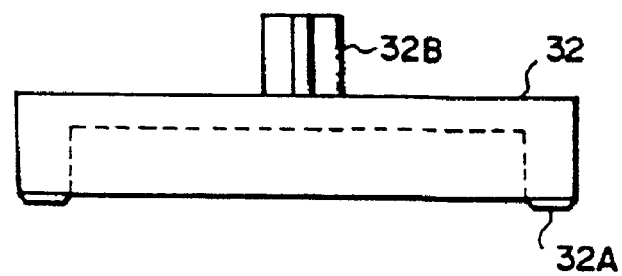
FIG. 3 is a side view of the second member of the brake member.
Figure 4:
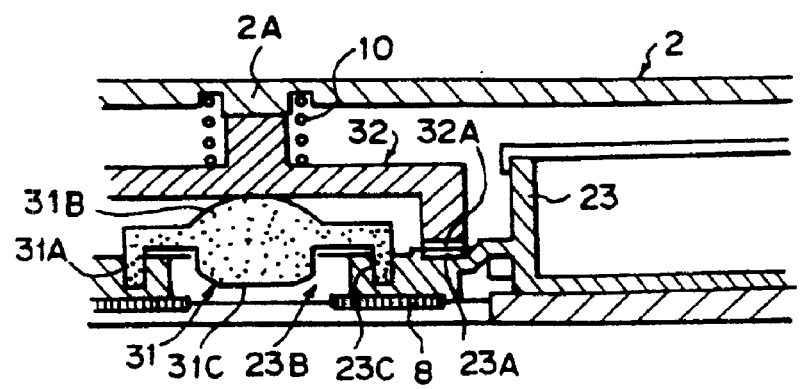
FIG. 4 is a fragmentary cross-sectional view showing an important part of the magnetic tape cartridge of the first embodiment.

The brake member 30 comprises a first member 31 having an annular protrusion 31A (FIG. 2) which is fitted in annular groove 23C of the reel hub 23 and a second member 32 having an annular protrusion which is projected downward as shown in FIG. 3. The brake gear 32A is formed on the lower end face of the annular protrusion of the second member 32. A projection 31B is formed on the upper surface of the first member 31 and the second member 32 rests on the projection 31 as shown in FIG. 4. Further an exposed portion 31C which is exposed outward through the opening 23B of the reel hub 23 as shown in FIG. 4 is formed on the lower surface of the first member 31. A projection 32B which is like a cross in cross-section and is normally held in a groove 2A which is like a cross in cross-section and is formed on the inner surface of the upper casing half 2 is provided on the upper surface of the second member 32.

The brake member 30 is urged downward by a coiled spring 10 fitted on the projection 32B and is positioned in the cartridge casing 8 with the annular protrusion 31A of the first member 31 received in the annular groove 32C of the reel hub 23, with the brake gear 32A and the stopper gear 23A in mesh with each other and with the projection 32B received in the groove 2A as shown in FIG. 4. The height of the first member 31 (the distance between the lower end face of the annular protrusion 32A and the top of the projection 31B) is set so that the second member 32 rests on the projection 31B of the first member 31 and the brake gear 32A and the stopper gear 23A are in mesh with each other so long as the second member 32 is in a position as urged by the coiled spring 10. Further the height of the annular protrusion 31A of the first member 31 and the depth of the annular groove 23C of the reel hub 23 are set so that the annular protrusion 31A is still in the annular groove 23C even if the first member 31 is lifted to its uppermost position. The first member 31 and/or the second member 32 is formed of low friction, hardwearing material such as polyoxymethylene, resin added with molybdenum or the like.

In this state, rotation of the reel 4 is prevented by engagement between the brake gear 32A and the stopper gear 23A. When the magnetic tape cartridge 1 is loaded in the recording and reproducing system, the brake release spindle of the recording and reproducing system pushes upward the exposed portion 31C of the brake member 30, whereby the first and second members 31 and 32 of the brake member 30 are moved upward overcoming the force of the coiled spring 10 and the gears 32A and 23A are disengaged from each other to permit rotation of the reel 4. At this time, though the annular protrusion 31A of the first member 31 is moved upward relative to the annular groove 23C of the reel hub 23, the protrusion 31A is not drawn out of the groove 23C as described above.

A tape outlet opening 26 through which the magnetic tape 20 is drawn out is formed in a side wall of the cartridge casing 7. The tape outlet opening 26 is closed and opened by a slide door 27 which is slidable in the directions of double-headed arrow A and is urged in the closing position by a spring not shown.

A leader pin 21 is fixed to the leading end of the magnetic tape 20 and when the magnetic tape cartridge 1 is not used, the magnetic tape 20 is entirely wound around the reel 4 with the leader pin 21 held in a recess 28 formed near the tape outlet opening 26.

When the magnetic tape cartridge 1 is loaded in a recording and reproducing system, the gears 23A and 32A of the hub 23 and the brake member 30 are disengaged from each other to permit rotation of the reel 4 in the manner described above and the drive mechanism of the recording and reproducing system holds the reel plate 8 under magnetic force and rotates the reel 4. At the same time, the slide door 27 is opened and the leader pin 21 is brought to a predetermined position in a tape running path, thereby recording or reproduction becomes feasible. In this state, since the annular protrusion 31A of the first member 31 is still in the annular groove 23C, dust cannot enter the cartridge casing 7 through the opening 23B of the reel hub 23.

Since the annular protrusion 31A is fitted in the annular groove 23C, the first member 31 is sometimes rotated relative to the second member 32 in response to rotation of the reel 4. In this particular embodiment, since the first member 31 is in contact with only at the projection 31B, sliding resistance is small and generation of wear tailings can be reduced. Further since the first member 31 and/or the second member 32 is formed of low friction, hardwearing material such as polyoxymethylene, sliding resistance is smaller and generation of wear tailings can be more reduced.

Figure 5:
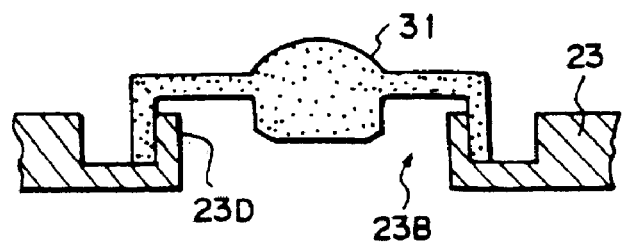
FIG. 5 is a fragmentary cross-sectional view showing a modification of the first embodiment.
Figure 6:
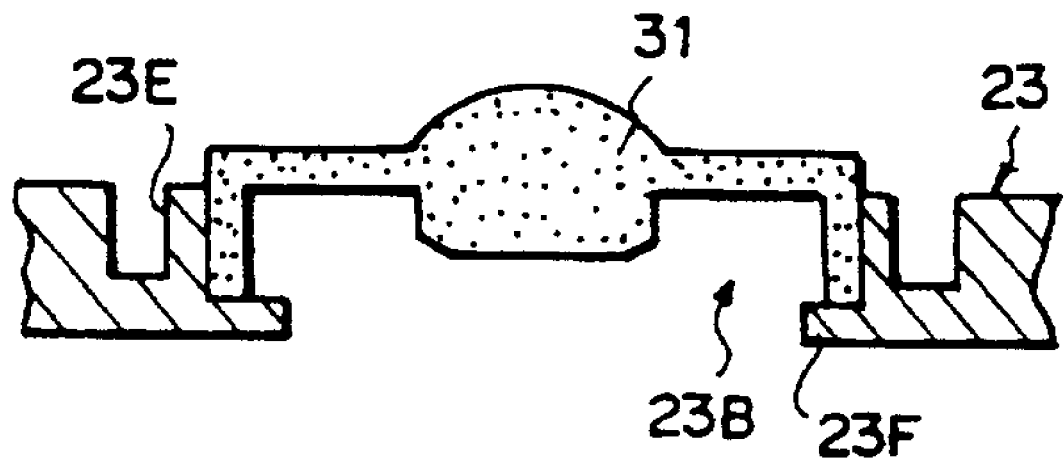
FIG. 6 is a view similar to FIG. 5 but showing another modification of the first embodiment.

Though, in the first embodiment described above, the groove 23C is formed in the reel hub 23 and the protrusion 31A of the first member 31 is fitted in the groove 23C, an annular wall portion 23D may be formed around the opening 23B as shown in FIG. 5, and the annular protrusion 31A may be fitted on the annular wall portion 23D. Otherwise an annular wall portion 23E may be formed around the opening 23B and the annular protrusion 31A may be fitted in the annular wall portion 23E as shown in FIG. 6. In this case, it is preferred that an annular flange 23F be provided to project inward from the annular wall portion 23E, thereby preventing the first member 31 from falling down through the opening 23B.

Further, though, in the first embodiment described above, the first member 31 is in abutment against the second member 32 at the projection 31B formed on the first member 31, such a projection may be formed on the second member 32 or on each of the first and second members 31 and 32.

A magnetic tape cartridge in accordance with a second embodiment of the present invention will be described with reference to FIGS. 7 to 9, hereinbelow.

Figure 7:
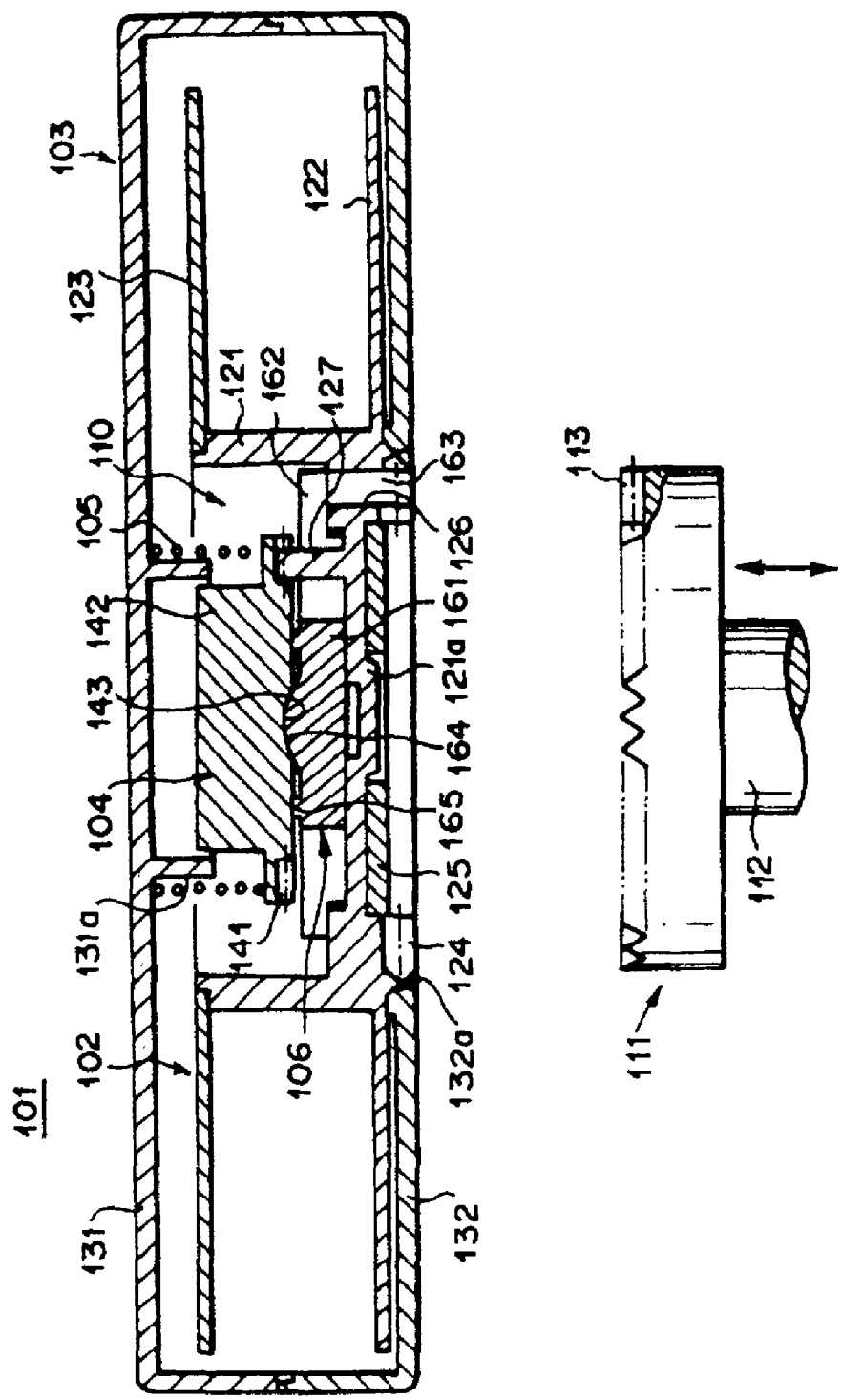
FIG. 7 is a cross-sectional view of a magnetic tape cartridge in accordance with a second embodiment of the present invention in a state where the magnetic tape cartridge is not used.

In FIG. 7, the magnetic tape cartridge 101 of the second embodiment comprises a single reel 102 around which a magnetic tape (not shown) is wound and is contained for rotation in a cartridge casing 103. The cartridge casing 103 is formed by fastening together upper and lower casing halves 131 and 132 by screws and the like. The lower casing half 132 is provided with a central opening 132a. Further the magnetic tape cartridge 101 is provided with a reel stopper means 110 which prevents rotation of the reel 102 when the magnetic tape cartridge 101 is not used and permits rotation of the reel 102 when the magnetic tape cartridge 101 is used.

The reel 102 comprises a reel hub 121 which is a cylindrical member having a bottom wall 121a and doughnut-shaped lower and upper flanges 122 and 123 extending outward from the lower and upper ends of the reel hub 121. The reel hub 121 and the lower flange 122 are formed integrally with each other by molding of synthetic resin and the upper flange 123 is fixed to the reel hub 121, for instance, by ultrasonic welding. Gear teeth (reel gear) 124 for driving the reel 102 are formed in a circle on the lower surface of the bottom wall 121a of the reel hub 121 and an annular reel plate 125 of magnetic metal is mounted on the lower surface of the bottom wall 121a inside the reel gear 124. The reel gear 124 and the reel plate 125 are exposed outside through the central opening 132a in the cartridge casing 132. The reel 102 is urged downward by an urging member 105 to be described later.

A reel drive means 111 of a tape drive system comprises a rotary spindle 112 provided with a drive gear 113 formed on the upper end face of the rotary spindle 112 and a magnet disposed on the upper end face of the same. When the magnetic tape cartridge 101 is loaded in the tape drive system, the rotary spindle 111 is moved upward toward the magnetic tape cartridge 101 and the drive gear 113 is brought into mesh with the reel gear 124 while the magnet attracts the reel plate 125 to hold the drive gear 113 in mesh with the reel gear 124.

The reel stopper means 110 comprises a brake member 104 which is movable up and down away from and toward the reel 102, an urging member 105 which urges the brake member 104 toward the reel 102 and a brake release member 106 which moves the brake member away from the reel 102.

Figure 8:
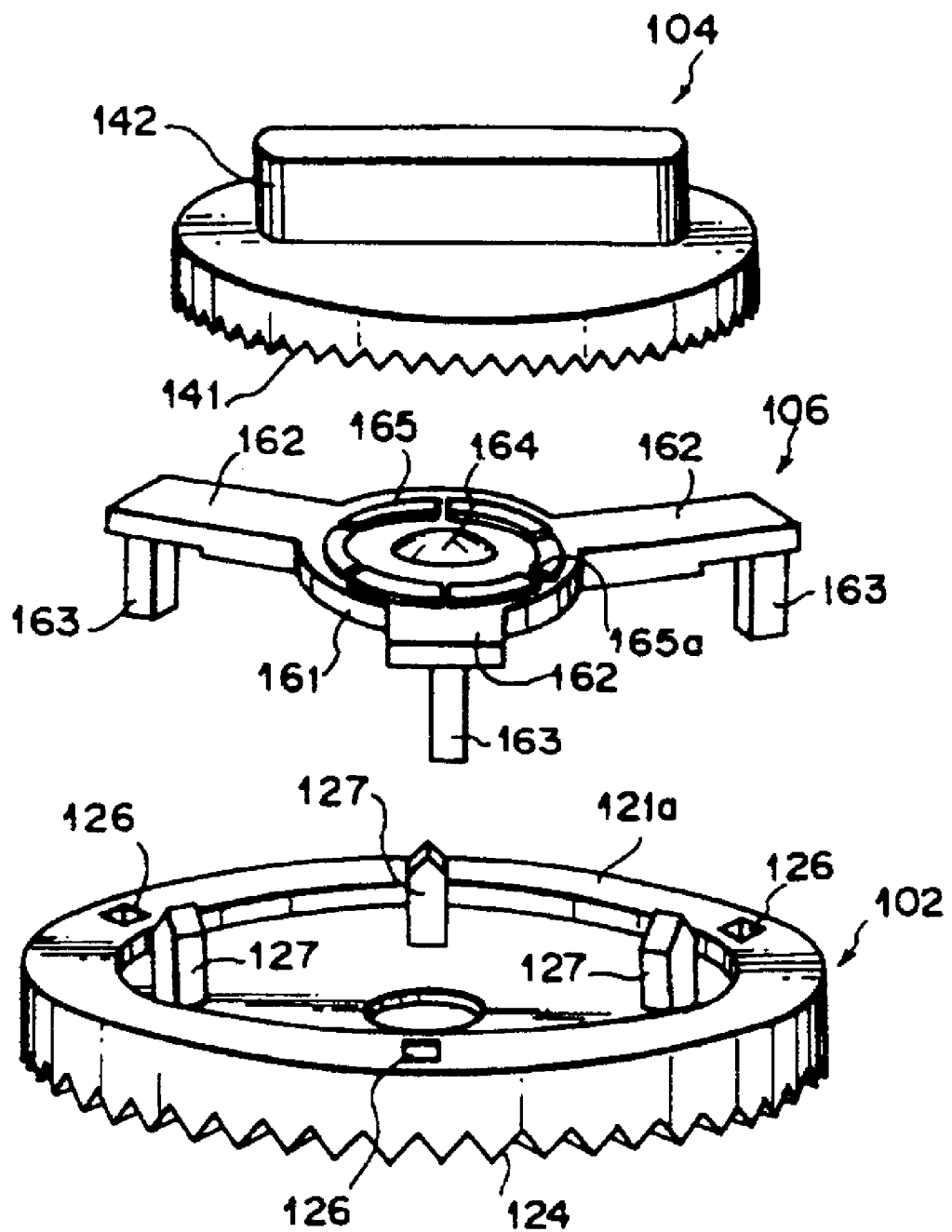
FIG. 8 is an exploded perspective view showing the reel stopper mechanism of the magnetic tape cartridge.

As shown in FIG. 8, three through holes 126 are formed in the bottom wall 121a of the reel hub 121 at regular intervals on a circle to extend through the bottom wall 121a at the portion where the reel gear 124 is formed. Further three engagement projections 127 are erected from the upper surface of the bottom wall 121a at regular intervals on a circle in positions angularly spaced from the through holes 126. The number of the through holes 126 and the engagement projections 127 need not be limited to three but for or more through holes 126 and engagement projections 127 may be formed. The upper end portion of each engagement projection 127 is shaped like a gear tooth and may be shaped like a plurality of gear teeth. In FIG. 8, only the bottom wall 121a of the reel hub 121 is shown as the reel 102.

The brake member 104 is a substantially disc-like member and is disposed in the reel hub 121 opposed to the bottom wall 121a of the reel hub 121. A plurality of gear teeth 141 (stopper gear) are annularly formed on the lower surface of the brake member 104 and are adapted to be brought into engagement with the engagement projections 127. A straight protrusion 142 extends upward from the upper surface of the brake member 104 and is fitted in a guide groove formed in a guide portion 131a projecting downward from the inner surface of the upper casing half 131, whereby the brake member 104 is able to be moved toward and away from the bottom wall 121a of the reel hub 121 without rotating relative to the reel hub 121. The protrusion 142 and the groove in the guide portion 131a may be like a cross in cross-section.

An urging member 105 in the form of a coiled spring compressed between the upper surface of the brake member 104 urges the brake member 104 toward the operative position where the stopper gear 141 and the engagement projections 127 are engaged with each other to prevent rotation of the reel 104.

The brake release member 106 is disposed between the brake member 104 and the bottom wall 121a of the reel hub 121 to be movable up and down. As shown in FIG. 8, the brake release member 106 comprises a central disc portion 161 and three arms 162 extending radially outward from the central disc portion 161. A rectangular push rod 163 extends downward from the free end of each arm 162 and is inserted for up and down movement into one of the through holes 126 formed in the bottom wall 121a of the reel hub 121 with its lower end projected into teeth portion of the reel gear 124 on the lower surface of the reel hub 121. The engagement projections 127 are positioned between the arms 162.

Figure 9:
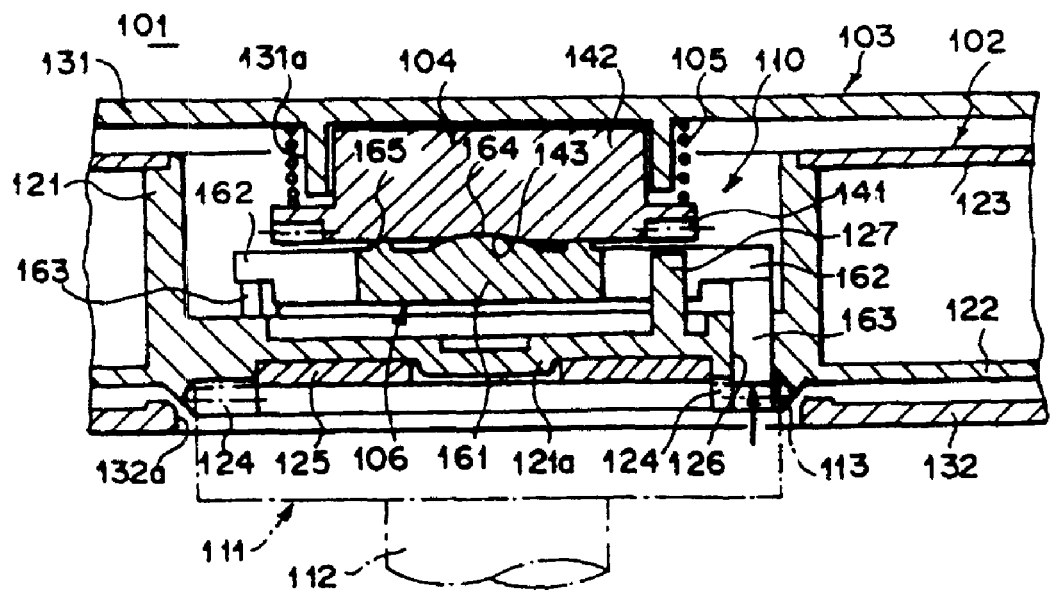
FIG. 9 is a fragmentary cross-sectional showing the magnetic tape cartridge in a state where it is used.

In the lowermost position of the brake release member 106 shown in FIG. 7, the lower end face of each push rod 163 is positioned substantially flush with the tips of the teeth of the reel gear 124 and, in response to chucking action of the rotary spindle 111 of the tape drive system for bringing the drive gear 113 into mesh with the reel gear 124, the push rods 163 are pushed upward to move upward the brake release member 106 by a predetermined amount, thereby disengaging the engagement projection 127 from the stopper gear 141 to permit rotation of the reel 102 as shown in FIG. 9. Since the push rods 163 are inserted into the through holes 126 in the reel hub 121, the brake release member 106 is rotated integrally with the reel 102.

The brake member 104 is urged downward by the urging means 105 so that the lower surface thereof abuts against the upper surface of the brake release member 106. A spherical projection 164 is formed on the upper surface of the central disc portion 161 coaxially with the axis of rotation of the brake release member 106, and a recess 143 having a curved bottom is formed on the lower surface of the brake member 104 so that the tip of the spherical projection 164 abuts against the center of the recess 143. Further an annular protrusion 165 is formed on the upper surface of the brake release member 106 around the spherical projection 164 and the lower surface of the brake member 104 abuts against the upper surface of the protrusion 165. Thus the brake member 104 and the brake release member 106 contact each other over a limited area, whereby the resistance to rotation of the reel 102 is reduced and generation of wear tailings can be suppressed.

As shown in FIG. 8, a plurality of slits 165a are formed in the annular protrusion 165 at predetermined intervals. Wear tailings generated between the contact surfaces of the brake member 104 and the brake release member 106 are gathered in the slits 165a so that the wear tailings are not held between the contact surfaces to promote wear.

Though, in the embodiment described above, the projection 164 and the protrusion 165 are formed on the brake release member 106, they may be formed on the brake member 104. Further only one of the projection 164 and the protrusion 165 may be formed. Since the peripheral speed increases toward the outer periphery of the central disc portion 161, it is preferred that the annular protrusion 165 be formed nearer to the center of the disc portion 161.

Figure 10:
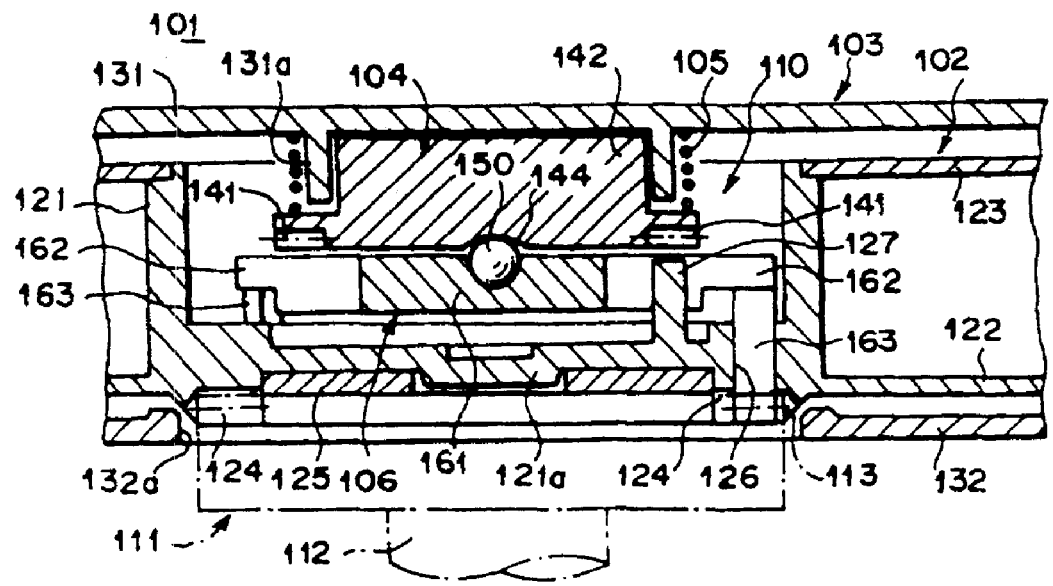
FIG. 10 is a fragmentary cross-sectional showing a modification of the magnetic tape cartridge of the second embodiment.

In the modification of the second embodiment shown in FIG. 10, the brake release member 106 contacts the brake member 104 at a ball 150 which is press-fitted in a recess formed on the upper surface of the brake release member 106 and is received in a recess 144 formed in the lower surface of the brake member 104. It is preferred that the ball 150 be formed hardwearing material such as steel or ceramics.

It is preferred that at least one of the brake member 104 and the brake release member 106 be formed of low friction, hardwearing material. For example, the brake member 104 is formed of polyoxymethylene while the brake release member 106 is formed of polycarbonate resin, polycarbonate resin added with graphite, ABS resin, ABS resin added with graphite, or nylon resin added with molybdenum.

Further, as clearly shown in FIG. 8, the protrusion 142 extends long substantially across the upper surface of the brake member 104 and accordingly the coiled spring 105 fitted on the protrusion 142 is large in diameter. That is, the coiled spring 105 acts on the brake member 104 at a portion near the outer periphery of the brake member 104. Accordingly the coiled spring 105 acts on the brake member 104 at a portion near the push rods 163 which are pushed upward by the rotary spindle 111 of the tape drive system. With this arrangement, deformation of the brake member 104, especially of the arms 162, can be suppressed, whereby the brake member 104 can be smoothly lifted without friction between the outer surface of the push rod 163 and the inner surface of the through hole 126. Since the thickness of the brake member 104, especially of the arms 162, is restricted, the brake member 104 is apt to be deformed when the working point at which the coiled spring 105 acts on the brake member 104 is remote from the working point at which the upward force transmitted from the rotary spindle 111 by way of the push rods 163 acts on the brake member 104. When the brake member 104 is deformed, the outer surface of the push rods 163 brought into contact with the inner surface of the through holes 126 and friction therebetween adversely affects the brake release operation.

A magnetic tape cartridge in accordance with a third embodiment of the present invention will be described with reference to FIG. 11, hereinbelow.

The magnetic tape cartridge of the third embodiment is substantially the same as the second embodiment, and accordingly the elements analogous to those in the second embodiment are given the same reference numerals and only the difference from the second embodiment will be mainly described. FIG. 11 is a view similar to FIG. 8 but showing the reel stopper mechanism in the third embodiment.

Figure 11:
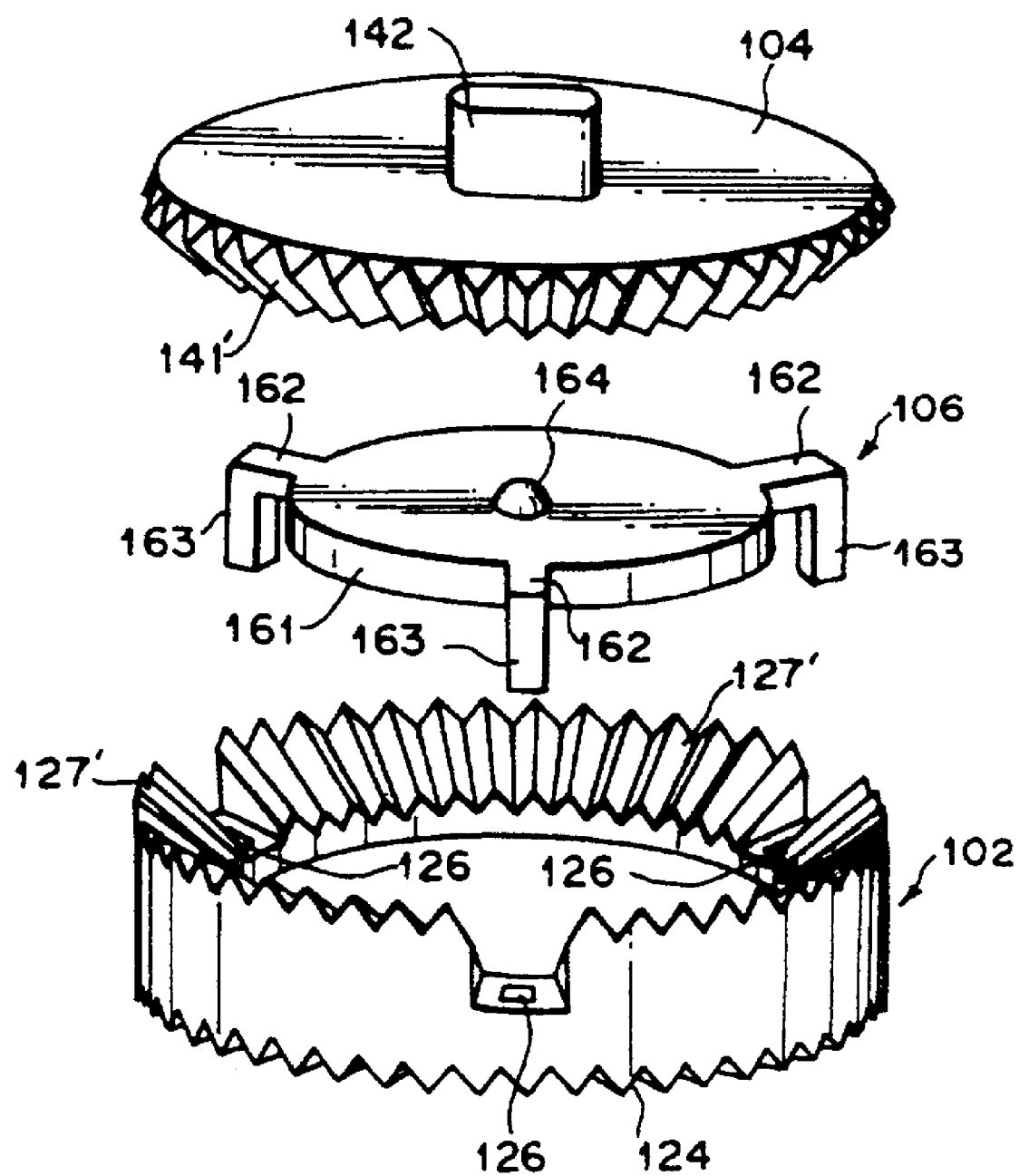
FIG. 11 is a view similar to FIG. 8 but showing the reel stopper mechanism in a magnetic tape cartridge in accordance with a third embodiment of the present invention.

As shown in FIG. 11, in this embodiment, rotation of the reel 102 is prevented by engagement of an external bevel gear 141' which is formed on the brake member 104 to conically taper toward the reel hub 121 and an internal bevel gear 127' which is formed on the reel hub 121 to conically flare toward the brake member 104. The internal bevel gear 127' is partly cut away and the through holes 126 into which the push rods 163 of the brake release member 106 are inserted are formed at the cutaway portions.

In this embodiment, since rotation of the reel 102 is prevented by engagement of the conical gears 141' and 127' and the former is pressed against the latter by the urging means, the brake member 104 is centered with respect to the reel hub 121 so that the center of the brake member 104 is on the axis of rotation of the reel 102 and the gears 141' and 127' are engaged with each other under a uniform pressure over the entire periphery thereof, whereby rotation of the reel 102 can be surely prevented. Further for the same reason, the brake member 104 can be lifted keeping the horizontal position by the spherical projection 164 when the push rods 163 are pushed downward and the gear 141' can be surely disengaged from the gear 127' over the entire periphery thereof.

Rotation of the reel 102 may be prevented by pressing a high friction conical surface on the brake member 104 against a high friction conical surface on the reel hub 121.

A magnetic tape cartridge in accordance with a fourth embodiment of the present invention will be described, hereinbelow.

Figure 12:
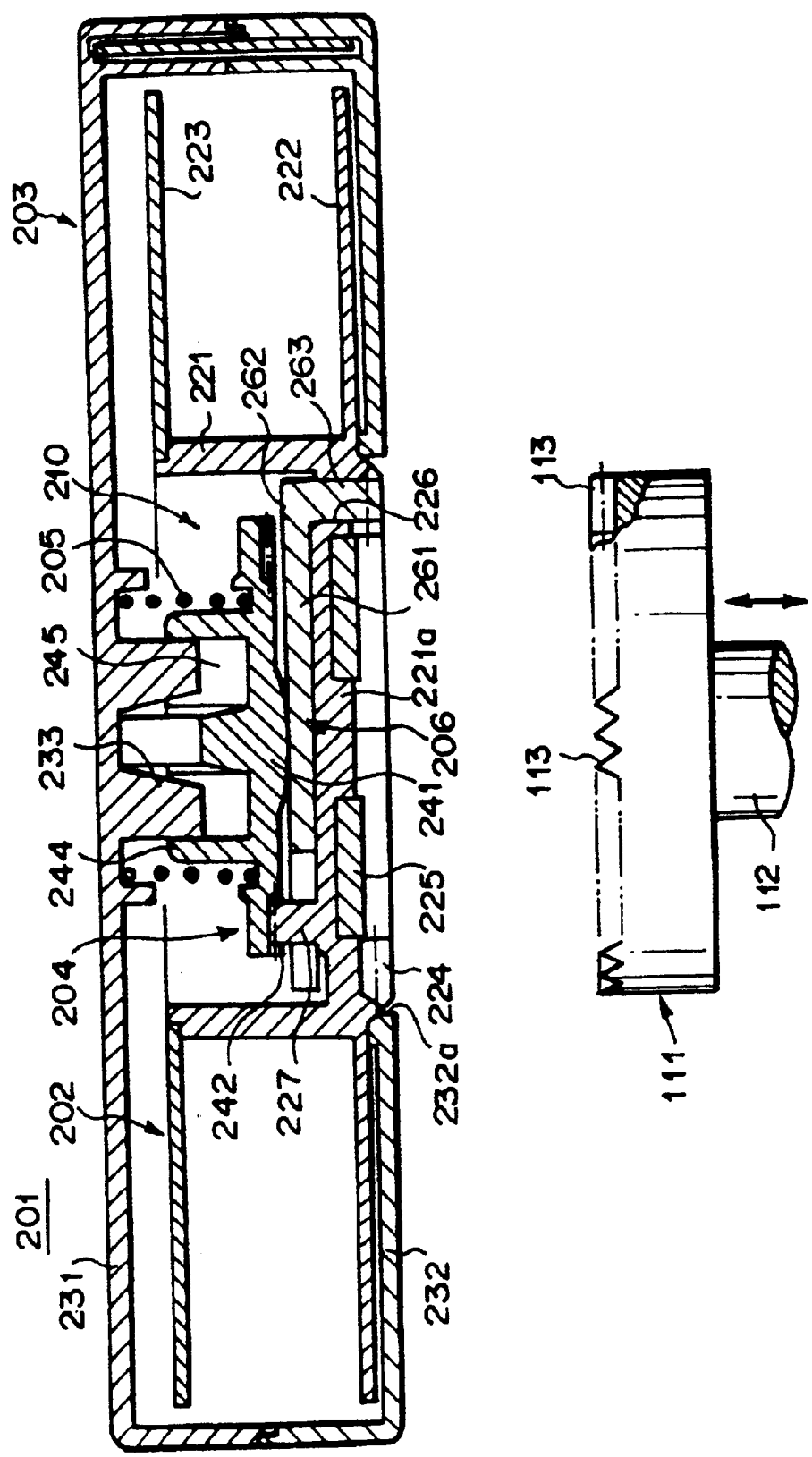
FIG. 12 is a cross-sectional view of a magnetic tape cartridge in accordance with a fourth embodiment of the present invention in a state where the magnetic tape cartridge is not used.

As shown in FIG. 12, the magnetic tape cartridge 201 of the fourth embodiment comprises a single reel 202 around which a magnetic tape (not shown) is wound and is contained for rotation in a cartridge casing 203. The cartridge casing 203 is formed by fastening together upper and lower casing halves 231 and 232 by screws and the like. The lower casing half 232 is provided with a central opening 232a. Further the magnetic tape cartridge 201 is provided with a reel stopper means 210 which prevents rotation of the reel 202 when the magnetic tape cartridge 201 is not used and permits rotation of the reel 202 when the magnetic tape cartridge 201 is used.

The reel 202 comprises a reel hub 221 which is a cylindrical member having a bottom wall 221a and doughnut-shaped lower and upper flanges 222 and 223 extending outward from the lower and upper ends of the reel hub 221. The reel hub 221 and the lower flange 222 are formed integrally with each other by molding of synthetic resin and the upper flange 223 is fixed to the reel hub 221, for instance, by ultrasonic welding. Gear teeth (reel gear) 224 for driving the reel 202 are formed in a circle on the lower surface of the bottom wall 221a of the reel hub 221 and an annular reel plate 225 of magnetic metal is mounted on the lower surface of the bottom wall 221a inside the reel gear 224. The reel gear 224 and the reel plate 225 are exposed outside through the central opening 232a in the cartridge casing 232. The reel 202 is urged downward by an urging member 205 to be described later.

When the magnetic tape cartridge 201 is loaded in the tape drive system, the rotary spindle 111 is moved upward toward the magnetic tape cartridge 201 and the drive gear 113 is brought into mesh with the reel gear 224 while the magnet attracts the reel plate 225 to hold the drive gear 113 in mesh with the reel gear 224.

The reel stopper means 210 comprises a brake member 204 which is movable up and down away from and toward the reel 202, an urging member 205 which urges the brake member 204 toward the reel 202 and a brake release member 206 which moves the brake member 204 away from the reel 202.

Figure 13:
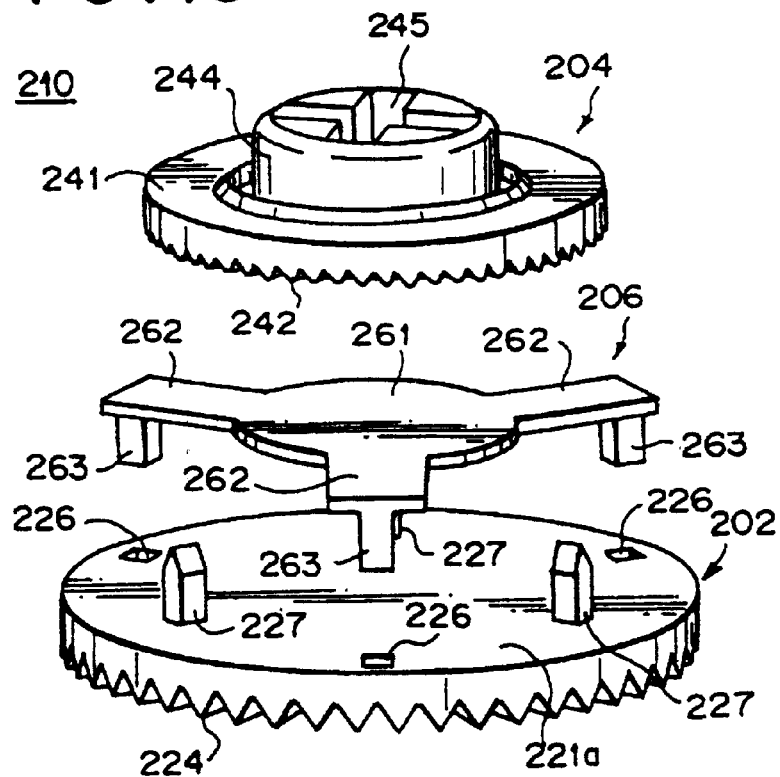
FIG. 13 is an exploded perspective view showing the reel stopper mechanism of the magnetic tape cartridge.

As shown in FIG. 13, three through holes 226 are formed in the bottom wall 221a of the reel hub 221 at regular intervals on a circle to extend through the bottom wall 221a at the portion where the reel gear 224 is formed. Further three engagement projections 227 are erected from the upper surface of the bottom wall 221a at regular intervals on a circle in positions angularly spaced from the through holes 226. In FIG. 13, only the bottom wall 221a of the reel hub 221 is shown as the reel 202.

The brake member 204 comprises a disc-like member 241 disposed in the reel hub 221 opposed to the bottom wall 221a of the reel hub 221. A plurality of gear teeth 242 (stopper gear) are annularly formed on the lower surface of the disc-like member 241 and are adapted to be brought into engagement with the engagement projections 227. The lower surface of the disc-like member 241 is bulged downward at a central portion thereof and the central portion is brought into abutment against the central portion of the upper surface of a central disc portion (to be described later) of the brake release member 206.

A protrusion 244 extends upward from the upper surface of the disc-like member 241 of the brake member 204 and an engagement groove 245 shaped like a cross in cross-section is formed in the protrusion 244. An engagement projection 233 projecting downward from the inner surface of the upper casing half 231 is inserted into the engagement groove 245, whereby the brake member 204 is able to be moved toward and away from the bottom wall 221a of the reel hub 221 without rotating relative to the reel hub 221.

An urging member 205 in the form of a coiled spring compressed between the upper surface of the brake member 204 urges the brake member 204 toward the operative position where the stopper gear 242 and the engagement projections 227 are engaged with each other to prevent rotation of the reel 204.

The brake release member 206 is disposed between the brake member 204 and the bottom wall 221a of the reel hub 221 to be movable up and down. As shown in FIG. 13, the brake release member 206 comprises a central disc portion 261 and three arms 262 extending radially outward from the central disc portion 261. A rectangular push rod 263 extends downward from the free end of each arm 262 and is inserted for up and down movement into one of the through holes 226 formed in the bottom wall 221a of the reel hub 221 with its lower end projected into teeth portion of the reel gear 224 on the lower surface of the reel hub 221. The engagement projections 227 are positioned between the arms 262. The push rod 263 may be circular or ellipsoidal in cross-section. The brake release member 206 may be shaped like a triangle with the push rods 263 formed to extend downward at the corners of the triangle.

Figure 14:
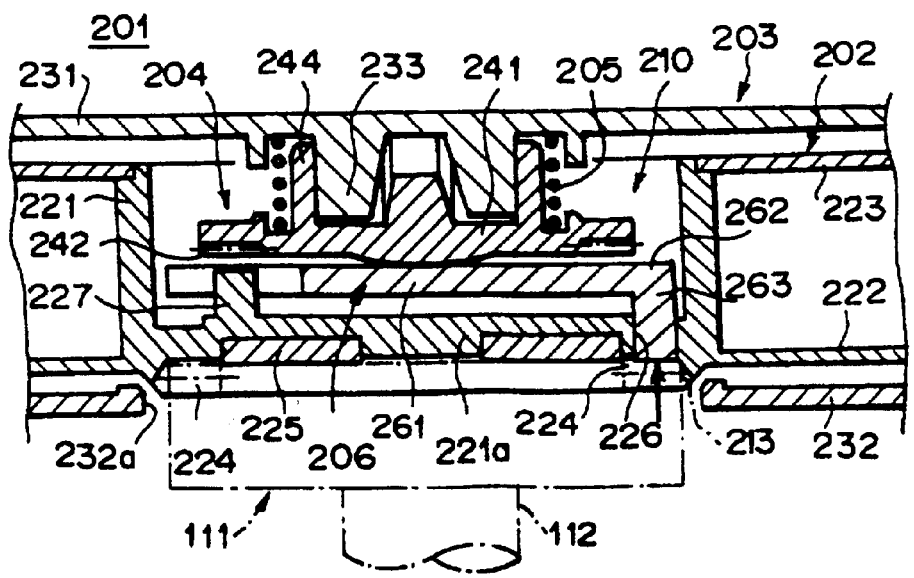
FIG. 14 is a fragmentary cross-sectional showing the magnetic tape cartridge in a state where it is used.

In the lowermost position of the brake release member 206 shown in FIG. 12, the lower end face of each push rod 263 is positioned substantially flush with the tips of the teeth of the reel gear 224 and, in response to chucking action of the rotary spindle 111 of the tape drive system for bringing the drive gear 113 into mesh with the reel gear 224, the push rods 263 are pushed upward to move upward the brake release member 206 by a predetermined amount, thereby disengaging the engagement projection 227 from the stopper gear 241 to permit rotation of the reel 202 as shown in FIG. 14. Since the push rods 263 are inserted into the through holes 226 in the reel hub 221, the brake release member 206 is rotated integrally with the reel 202.

The brake member 204 is urged downward by the urging means 205 so that the bulged central portion of the lower surface thereof is in sliding contact with the upper surface of the brake release member 206.

Each of the through holes 226 formed in the reel hub 221 opens downward at the portion of the lower surface of the reel hub 221 at which the reel gear 224 is formed in an area including at least a pair of opposed flanks of the reel gear 221 which form a valley of the reel gear 224. The through hole 226 may be of a rectangle, circle or ellipsoid or the like according to the cross-sectional shape of the push rod 263.

Figure 15:
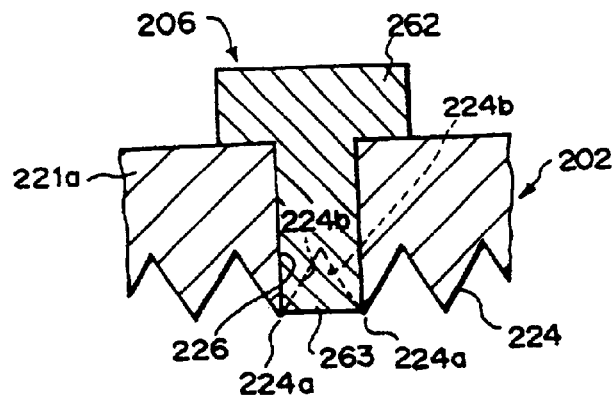
FIG. 15 is a fragmentary cross-sectional view showing an example of the through hole and the push rod employed in the fourth embodiment.

For example, as shown in FIG. 15, the through hole 226 opens in a width of one pitch of the reel gear 224 by cutting away a pair of flanks 224a between the tips 224a of a pair of adjacent teeth. In this example, the opposed flanks 224a are inclined at the same angle and the center of the push rod 263 coincides with the center of the valley formed by the flanks 224a and with the tip of a tooth of the drive gear 113 in mesh with the reel gear 224.

Figure 18:
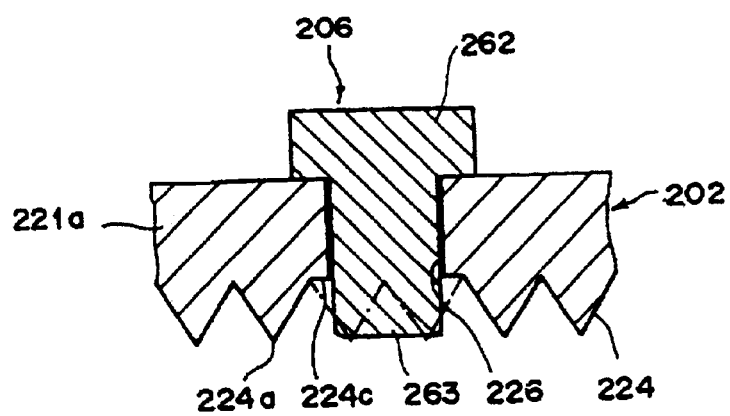
FIG. 18 is a fragmentary cross-sectional view showing still another example of the through hole and the push rod employed in the fourth embodiment.
Figure 19:
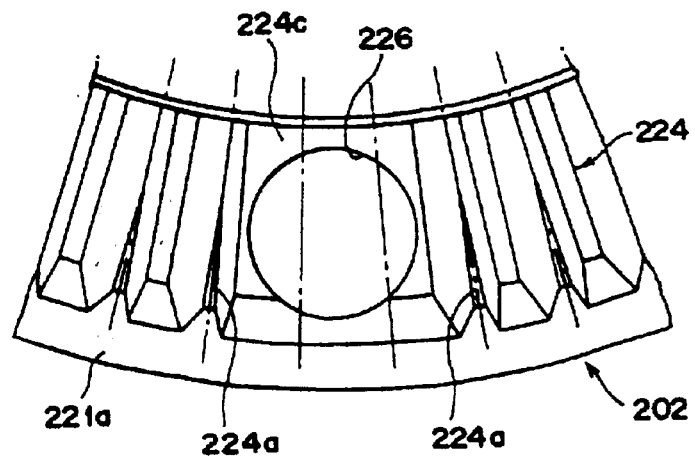
FIG. 19 is a fragmentary cross-sectional view showing still another example of the through hole employed in the fourth embodiment.

The through hole 226 should cover at least one valley and when each valley of the reel gear 224 is small because of a small diameter of the reel gear 224 or a small number of teeth, the through hole 226 is extended on one side or opposite sides of the valley as shown in FIGS. 18 and 19 to be described later.

With this arrangement, even if the phase of the drive gear 113 is shifted from the phase of the reel gear 224 within one pitch when the former is brought into mesh with the latter, the tip of a tooth of the drive gear 113 can be surely brought into abutment against the lower end face of the push rod 263, whereby the push rod 263 can be surely lifted to disengage the stopper gear 242 from the engagement projections 227.

Figure 16A:
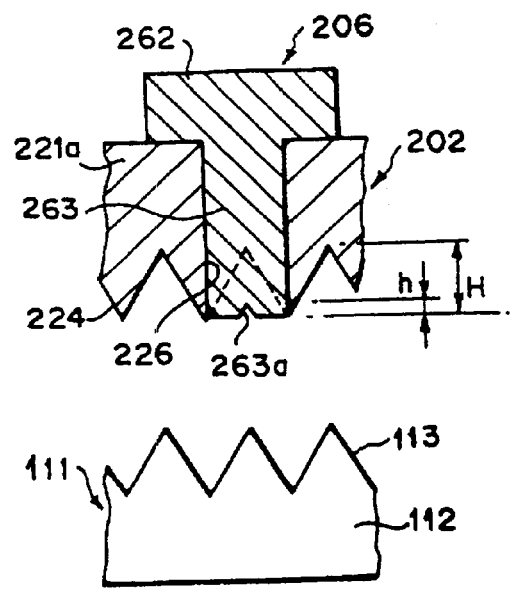
FIGS. 16A and 16B are fragmentary cross-sectional views showing another example of the through hole and the push rod employed in the fourth embodiment.
Figure 16B:
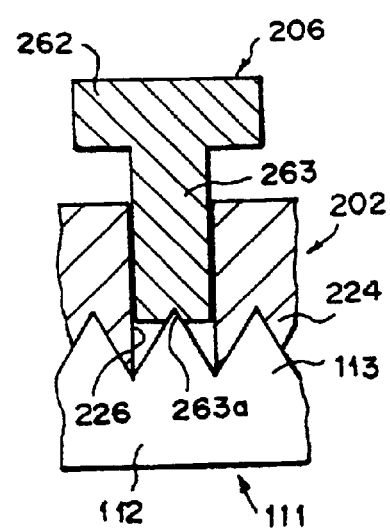

A recess 263a which is adapted to be engaged with the tip of a tooth of the drive gear 113 may be formed on the lower surface of the push rod 263 as shown in FIGS. 16A and 16B.

Figure 17:
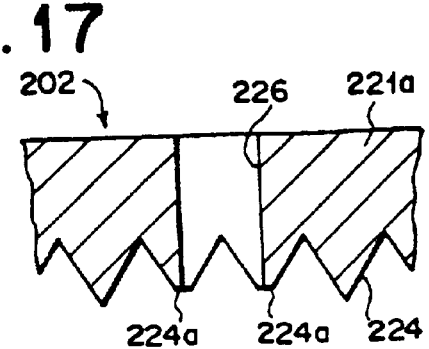
FIG. 17 is a fragmentary cross-sectional view showing still another example of the through hole employed in the fourth embodiment.

The tips 224a of the teeth on opposite sides of the through hole 226 may be cut flat as shown in FIG. 17. Otherwise such tips may be rounded or chamfered.

With this arrangement, generation of sharp edges by cutting away a part of the reel gear 224 can be avoided, which facilitates formation of the mold for molding the reel hub 221 and facilitates molding of the reel hub 221.

In the modification shown in FIG. 18, the through hole 226 is wider than one pitch of the reel gear 224 and is formed by cutting away a pair of adjacent teeth from the root thereof with a pair of flat surfaces 24*c* formed on opposite sides of the through hole 226.

In the modification shown in FIG. 19, the tip 224*a* of each tooth of the reel gear 224 is flat on the outer portion and sharp on the inner portion and the height of the tooth becomes smaller toward the inner periphery. Further the inclinations of the flanks on opposite sides of each valley differ from each other. The through hole 226 is wider than one pitch of the reel gear 224 and is formed by cutting away a pair of adjacent teeth from the root thereof with a pair of flat surfaces 24*c* formed on opposite sides of the through hole 226.

Figure 20:
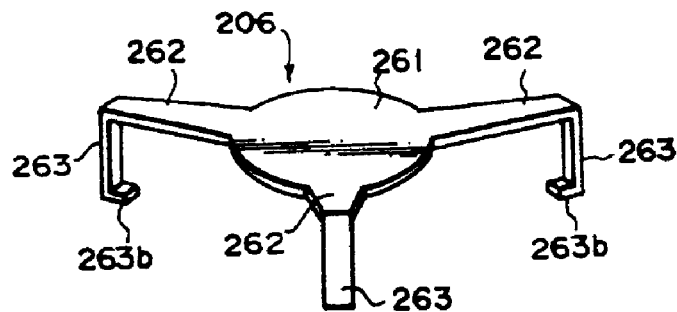
FIGS. 20 and 21 show modifications of the brake release member.
Figure 21:
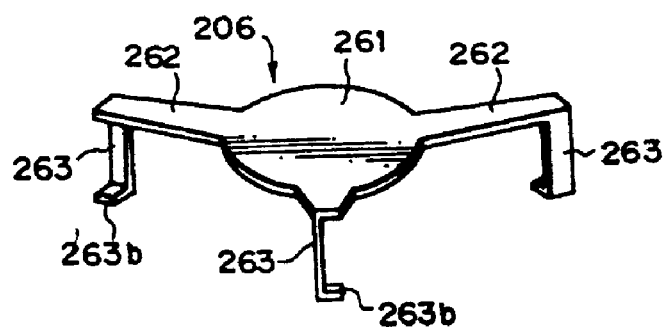

FIGS. 20 and 21 show modifications of the brake release member 206. In these modifications, a blank in the form of a development of the brake release member 206 is stamped out from a sheet metal and the blank is bent into the brake release member 206. In the modification shown in FIG. 20, the blank has push rod portions extending in the longitudinal direction of the portions forming the arms 262 and the push rod portions are bent downward by 90° to form the push rods 263. The tip portion of each of the push rod portions is further bent to form an abutment portion 263*b* on the lower end of the push rod 263. In the modification shown in FIG. 21, the blank has push rod portions extending laterally from the ends of the portions forming the arms 262 and the push rod portions are bent downward by 90° to form the push rods 263. The tip portion of each of the push rod portions is further bent to form an abutment portion 263*b* on the lower end of the push rod 263.

By thus forming the brake release member 206 of sheet metal, the brake release member 206 can be sufficiently rigid for its thickness.

It is preferred that the push rod 263 be arranged so that the push rod 263 contacts with the inner surface of the through hole 226 at fine protrusions formed on the outer surface of the push rod 263 or on the inner surface of the through hole 226 to extend in the longitudinal direction of the push rod 263 in order to reduce the contact area therebetween.

Figure 22A:
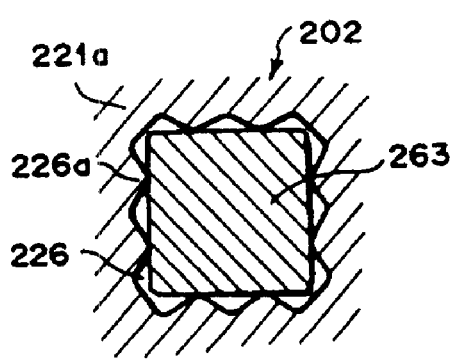
FIGS. 22A and 22B are cross-sectional views showing modifications of the shapes of the push rod and the through hole.
Figure 22B:
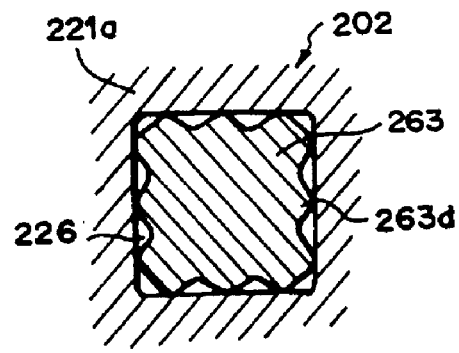

In the example shown in FIG. 22A, the push rod 263 is square in cross-section and a plurality of protrusions 226*a* are formed on the inner surface of the through hole 226 to extend in the longitudinal direction of the push rod 263, whereby the push rod 263 contacts with the inner surface of the through hole 226 only at the protrusions 226*a*. In the example shown in FIG. 22B, a plurality of protrusions 263*d* are formed on the outer surface of the push rod 263 to extend in the longitudinal direction of the push rod 263.

Figure 23A:
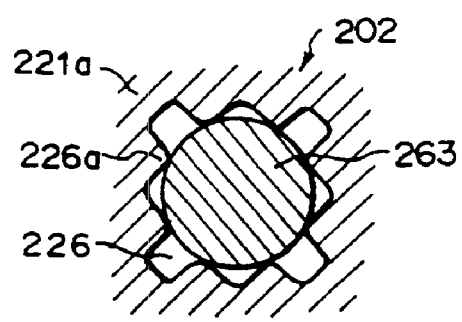
FIGS. 23A and 23B are cross-sectional views showing modifications of the shapes of the push rod and the through hole.
Figure 23B:
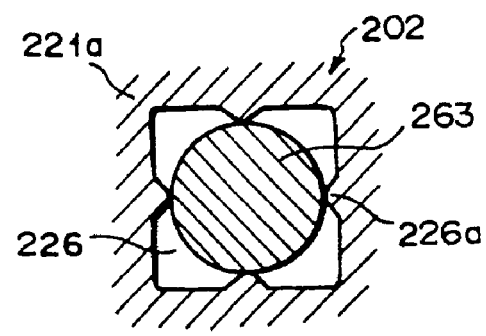

In the examples shown in FIGS. 23A and 23B, the push rod 263 is circular in cross-section, a plurality of protrusions 226*a* are formed on the inner surface of the through holes 226.

In the examples shown in FIGS. 22A, 22B, 23A and 23B, the protrusions 226*a* and 263*d* are about several tens μm though exaggerated in the drawings.

A magnetic tape cartridge 301 in accordance with a fifth embodiment of the present invention will be described with reference to FIGS. 24 and 25, hereinbelow. The magnetic tape cartridge 301 of this embodiment differs from that of the second embodiment mainly in the structure of the reel stopper means, and accordingly only the structure of the reel stopper means will be mainly described.

Figure 25:
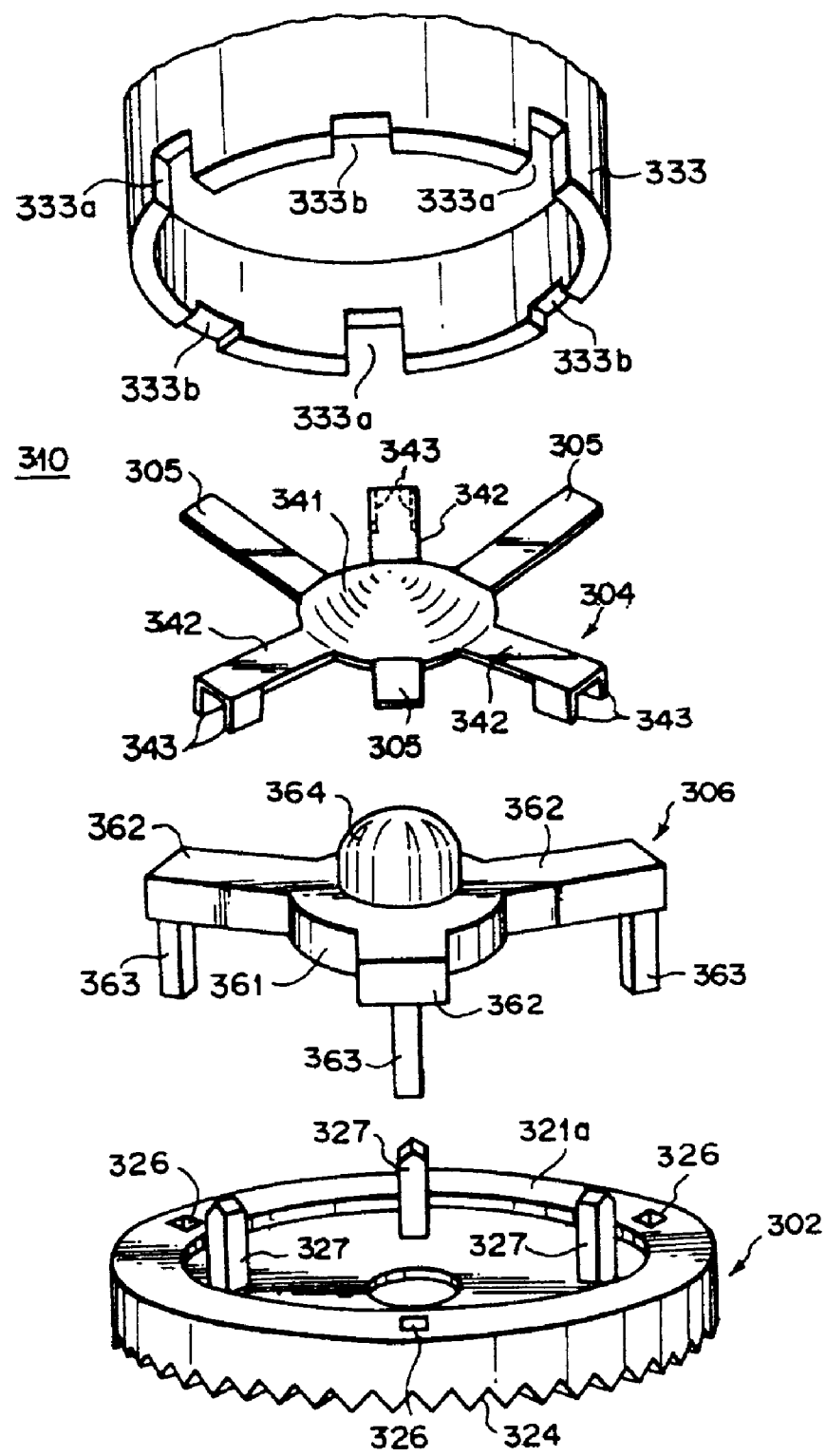
FIG. 25 is an exploded perspective view showing the reel stopper mechanism of the magnetic tape cartridge.

As shown in FIGS. 24 and 25, in this embodiment, the reel stopper means 310 comprises a brake member 304 which is movable up and down away from and toward the reel 302, an urging member 305 which is formed integrally with the brake member 304 and urges the brake member 304 toward the reel 302 and a brake release member 306 which moves the brake member away from the reel 302.

As shown in FIG. 25, three through holes 326 are formed in the bottom wall 321*a* of the reel hub 321 at regular intervals on a circle to extend through the bottom wall 321*a* at the portion where the reel gear 324 is formed. Further three engagement projections 327 are erected from the upper surface of the bottom wall 321*a* at regular intervals on a circle in positions angularly spaced from the through holes 326. The upper end portion of each engagement projection 327 is tapered. In FIG. 8, only the bottom wall 321*a* of the reel hub 321 is shown as the reel 302.

The brake member 304 is formed by a plate material and has a central disc portion 341 convex upward and concave downward and three arms 342 extending radially outward from the disc portion 341. The free end portion of each arm 342 is bent downward to form a pair of engagement portions 343 which forms an engagement recess in which the tip of the engagement projection 327 is fitted to prevent rotation of the reel 302. Three spring plates 305 extend radially outward from the disc portion 341 between the arms 342.

An annular holding portion 333 extends downward from the inner surface of the upper casing half 331. Three first recesses 333*a* are formed on the lower end face of the holding portion 333 at regular intervals and three second recesses 333*b* are formed on the lower end face of the holding portion 333 between the first recesses 333*a*. The first recesses 333*a* are deeper than the second recesses 333*b* and the free end portions of the arms 342 are inserted into the first recesses 333*a* to be movable up and down. The free end portions of the plate springs 305 are engaged in the second recesses 333*b*.

With this arrangement, the brake member 304 is able to be moved toward and away from the bottom wall 321*a* of the reel hub 321 without rotating relative to the reel hub 321, and is urged toward the reel hub 304 by the plate springs 305.

The brake release member 306 is disposed between the brake member 304 and the bottom wall 321*a* of the reel hub 321 to be movable up and down. As shown in FIG. 25, the brake release member 306 comprises a central disc portion 361 and three arms 362 extending radially outward from the central disc portion 361. A rectangular push rod 363 extends downward from the free end of each arm 362 and is inserted for up and down movement into one of the through holes 326 formed in the bottom wall 321*a* of the reel hub 321 with its lower end projected into teeth portion of the reel gear 324 on the lower surface of the reel hub 321. The engagement projections 327 are positioned between the arms 362.

A spherical projection 364 is formed on the upper surface of the central disc portion 361 and is in contact with the lower concave surface of the central disc portion 341.

In the lowermost position of the brake release member 306 shown in FIG. 24, the lower end face of each push rod 363 is positioned substantially flush with the tips of the teeth of the reel gear 324 and, in response to chucking action of the rotary spindle 111 of the tape drive system for bringing the drive gear 113 into mesh with the reel gear 324, the push rods 363 are pushed upward to move upward the brake release member 306 by a predetermined amount, thereby disengaging the engagement projection 327 from the engagement portions 343 to permit rotation of the reel 302. Since the push rods 363 are inserted into the through holes 326 in the reel hub 321, the brake release member 306 is rotated integrally with the reel 302.

In this embodiment, since the brake member 304 and the urging means 305 are integral with each other, the number of parts can be reduced and assembly of the magnetic tape cartridge is facilitated.

A magnetic tape cartridge 401 in accordance with a sixth embodiment of the present invention will be described with reference to FIGS. 26 and 27, hereinbelow. The magnetic tape cartridge 401 of this embodiment differs from that of the second embodiment mainly in the structure of the reel stopper means, and accordingly only the structure of the reel stopper means will be mainly described.

Figure 26:
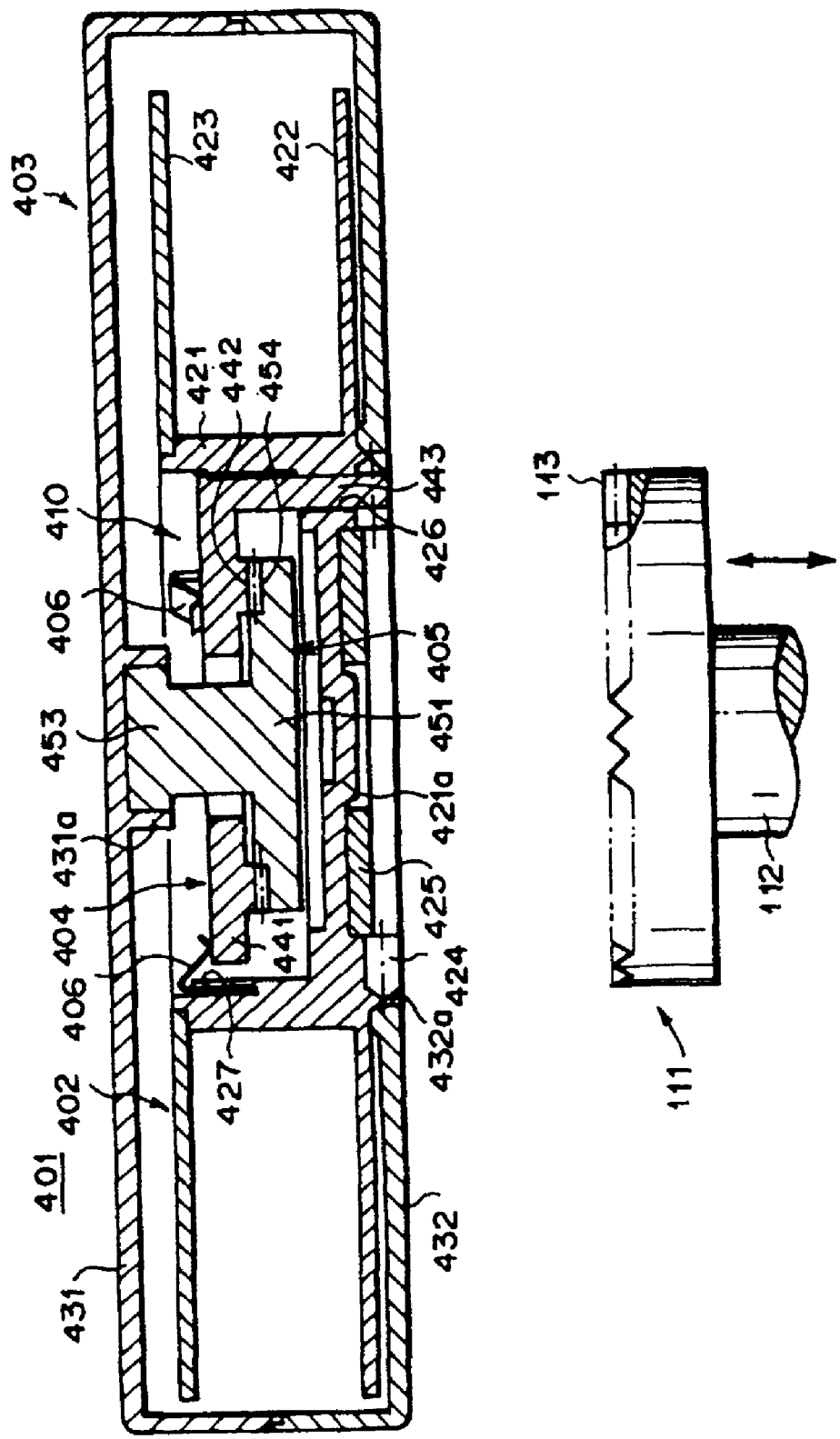
FIG. 26 is a cross-sectional view of a magnetic tape cartridge in accordance with a sixth embodiment of the present invention in a state where the magnetic tape cartridge is not used.
Figure 27:
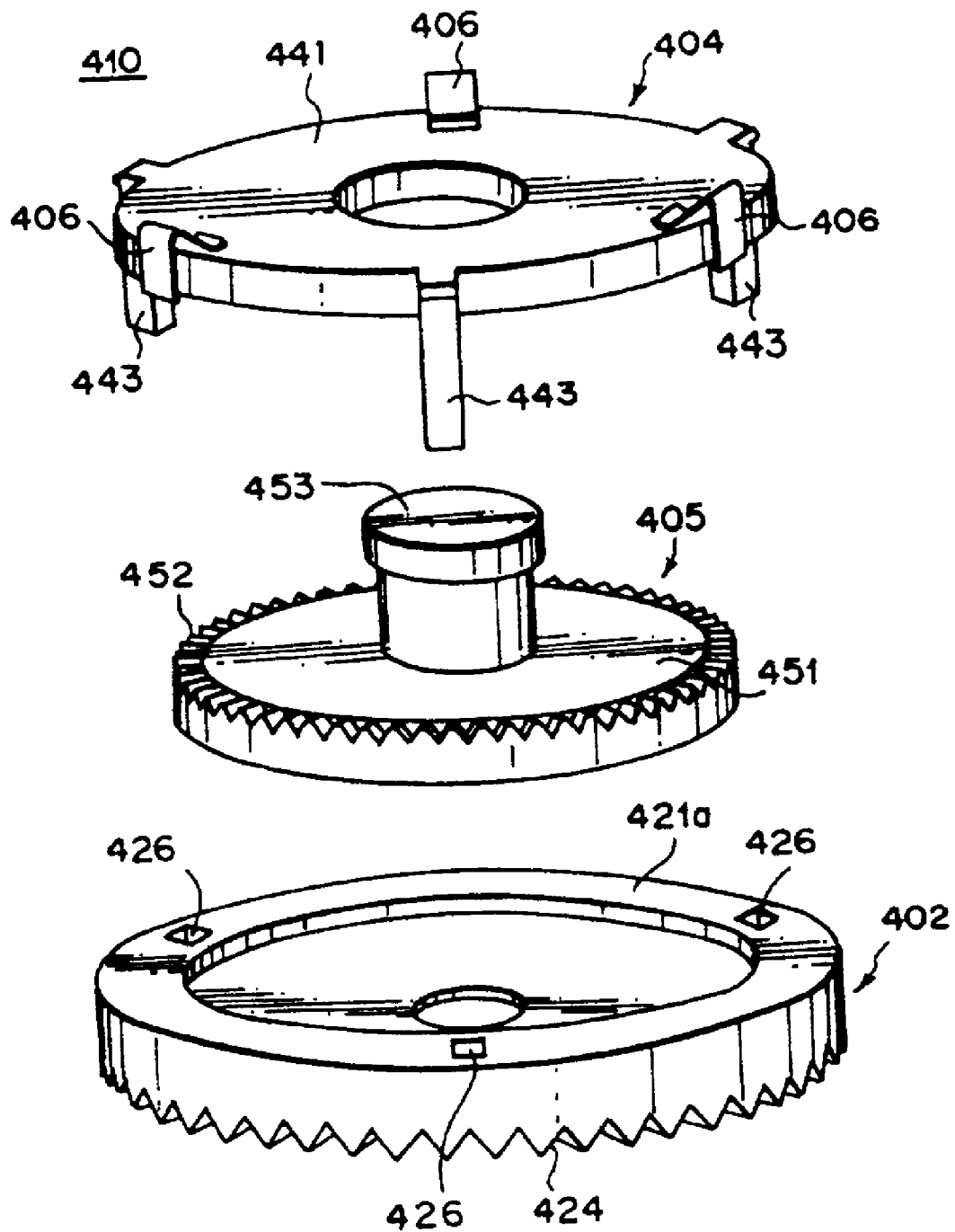
FIG. 27 is an exploded perspective view showing the reel stopper mechanism of the magnetic tape cartridge.

As shown in FIGS. 26 and 27, in this embodiment, the reel stopper means 410 comprises a brake release member 404 which is rotatable integrally with the reel 402 and is movable up and down away in response to chucking operation of the rotary spindle 111 of the tape drive system, a brake member 405 which is fixed to the cartridge casing 403 and is brought into engagement with a part of the brake release member 404 to prevent rotation of the reel 402, and urging members 406 which urges the brake release member 404 toward the position where it engages with the brake member 405.

As shown in FIG. 27, three through holes 426 are formed in the bottom wall 421a of the reel hub 421 at regular intervals on a circle to extend through the bottom wall 421a at the portion where the reel gear 424 is formed. Further three spring retainer projections 427 are formed on the inner peripheral surface of the reel hub 421 at regular intervals in positions angularly spaced from the through holes 426 as shown in FIG. 26. Each spring retainer portion 427 is provided with a recess into which the base portion of a plate spring 406 (urging member) is inserted as will be described later. In FIG. 27, only the bottom wall 421a of the reel hub 421 is shown as the reel 402.

The brake member 405 comprises a disc portion 451. A stopper gear 452 is formed on the upper surface of the disc portion 451 along the outer periphery thereof and a projection 453 extends upward at the central portion of the disc portion 451. The projection 453 is fixed in an annular recess 431a formed on the inner surface of the upper casing half 431, whereby the brake member 405 is fixed to the cartridge casing 403 not to be rotatable. The brake member 405 is disposed inside the reel hub 421 opposed to the bottom wall 421a thereof.

The brake release member 404 comprising an annular portion 441 provided with a central opening. A brake gear 442 (FIG. 26) which is adapted to be engaged with the stopper gear 452 is formed on the lower surface of the annular portion 441. The brake release member 404 is disposed above the brake member 405 to be movable up and down with the projection 453 of the brake member 405 extending through the central opening of the annular portion 441. Three rectangular push rods 443 extend downward from the outer periphery of the annular portion 441 and are inserted for up and down movement into the through holes 426 formed in the bottom wall 421a of the reel hub 421 with its lower end projected into teeth portion of the reel gear 424 on the lower surface of the reel hub 421.

Each of the plate springs 406 comprises a vertical base portion and a curved resilient arm portion. The plate spring 406 is mounted on the reel hub 421 by inserting the base portion into the spring retainer portion 427 with the resilient arm portion in abutment against the upper surface of the annular portion 441 of the brake release member 404.

In the lowermost position of the brake release member 404 shown in FIG. 26, the lower end face of each push rod 443 is positioned substantially flush with the tips of the teeth of the reel gear 424 and, in response to chucking action of the rotary spindle 111 of the tape drive system for bringing the drive gear 113 into mesh with the reel gear 424, the push rods 443 are pushed upward to move upward the brake release member 404 by a predetermined amount, thereby disengaging the stopper gear 452 from the brake gear 442 to permit rotation of the reel 402. Since the push rods 443 are inserted into the through holes 426 in the reel hub 421, the brake release member 404 is rotated integrally with the reel 402. In this embodiment, since the brake release member 404 is rotated without contacting the brake member 405, resistance to rotation of the reel 402 is reduced and generation of wear tailings is prevented.

In the embodiments described above, it is preferred that the brake release member be formed of fiber reinforced resin such as long-fiber reinforced resin, carbon fiber reinforced resin and the like. Such fiber reinforced resin comprises polyamide resin, polyoxymethylene, polycarbonate, ABS resin, polybutylene terephthalate and the like added with glass fiber, carbon fiber, boron fiber, silicon carbide fiber, alumina fiber and the like.

Further it is preferred that the brake member and/or the brake release member be formed of synthetic resin containing therein lubricant such as molybdenum, polytetrafluoroethylene, graphite, potassium titanate whisker, silicone formed of dimethyl polysiloxane of various grades and modifications thereof and the like.

In addition to the lubricant listed above, amide oleate lubricant, ercuamide lubricant, amide stearate lubricant, bis-aliphatic acid lubricant, nonionic surface active agent lubricant, hydrocarbon lubricant, aliphatic acid lubricant, ester lubricant, alcohol lubricant, metal soap and the like may be added.

As the synthetic resin, polycarbonate, polyoxymethylene, PPS, aliphatic polyamide such as nylon 6, nylon 66 (6, 6; 6/6) and the like, aromatic polyamide, ultra-high-molecular-weight polyethylene, isotactic polypropylene, syndiotactic polystyrene, and hardwearing resin having an imide group such as polyimide, polyamide-imide, polyether imide and the like are preferred.

What is claimed is:

1. A magnetic tape cartridge, comprising:
    (a) a cartridge casing;
    (b) a tape reel which is contained within the cartridge casing and which is configured to rotate within the cartridge casing;
    (c) a brake assembly which is movable between an operative state that prevents rotation of the tape reel and a non-operative state that permits rotation of the tape reel, wherein the brake assembly includes:
        (i) a non-rotatable brake member, and
        (ii) a brake release member which is rotatably coupled with the tape reel and which is movable along a direction that extends from the tape reel toward the non-rotatable brake member, the brake release member defining a set of projections that extend in the direction from the tape reel toward the non-rotatable brake member in order to push the non-rotatable member such that the brake assembly moves between the operative state and the non-operative state.

2. The magnetic tape cartridge of claim 1, wherein the non-rotatable brake member defines a spherically-shaped recess, and wherein the set of projections has a spherically-shaped projection that abuts the spherically-shaped recess defined by the non-rotatable brake member.

3. The magnetic tape cartridge of claim 2, wherein the spherically-shaped projection of the set of projections resides at an axis of rotation of the brake release member, and wherein the spherically-shaped recess defined by the non-rotatable brake member resides at the axis of rotation of the brake release member.

4. The magnetic tape cartridge of claim 3, wherein the set of projections further includes a set of annular protrusions which extends in the direction from the tape reel toward the non-rotatable brake member.

5. The magnetic tape cartridge of claim 4, wherein the set of annular protrusions defines a set of slits to gather wear tailings generated during rotation of the tape reel.

6. The magnetic tape cartridge of claim 1, wherein the set of projections includes a set of annular protrusions which extends in the direction from the tape reel toward the non-rotatable brake member.

7. The magnetic tape cartridge of claim 6, wherein the set of annular protrusions defines a set of slits to gather wear tailings generated during rotation of the tape reel.

8. The magnetic tape cartridge of claim 1, wherein the brake release member is formed of fiber reinforced resin.

9. The magnetic tape cartridge of claim 8, wherein the fiber reinforced resin is long-fiber reinforced resin.

10. The magnetic tape cartridge of claim 8, wherein the fiber reinforced resin is carbon fiber reinforced resin.

11. The magnetic tape cartridge of claim 1, wherein at least one of the brake release member and the brake member is formed of synthetic resin.

12. The magnetic tape cartridge of claim 11, wherein the synthetic resin includes a lubricant.

13. The magnetic tape cartridge of claim 12, wherein the lubricant is one of a group consisting of molybdenum, polytetrafluoroethylene, graphite, potassium titanate whisker, and silicone formed of dimethyl polysiloxane.

14. A magnetic tape cartridge, comprising:
(a) a cartridge casing;
(b) a tape reel which is contained within the cartridge casing and which is configured to rotate within the cartridge casing;
(c) a brake assembly which is movable between an operative state that prevents rotation of the tape reel and a non-operative state that permits rotation of the tape reel, wherein the brake assembly includes:
(i) a non-rotatable brake member, and
(ii) a brake release member which is rotatably coupled with the tape reel and which is movable along a direction that extends from the tape reel toward the non-rotatable brake member, the brake release member defining a set of projections that extend in the direction from the tape reel toward the non-rotatable brake member, the set of projections including means for abutting the non-rotatable member such that the brake assembly moves between the operative state and the non-operative state.

15. The magnetic tape cartridge of claim 14, wherein the set of projections further includes means for gathering wear tailings generated during rotation of the tape reel.

16. The magnetic tape cartridge of claim 14, wherein at least one of the non-rotatable brake member and the brake release member includes means for lubricating a contact between the non-rotatable brake member and the brake release member.

* * * * *